US006855785B2

(12) United States Patent
Baumgart et al.

(10) Patent No.: US 6,855,785 B2
(45) Date of Patent: Feb. 15, 2005

(54) THERMALLY SETTING SUBSTANCE MIXTURE AND USE THEREOF

(75) Inventors: Hubert Baumgart, Münster (DE); Uwe Meisenburg, Duisburg (DE); Karl-Heinz Joost, Drensteinfurt (DE)

(73) Assignee: BASF Coatings AG, Munster (DE)

( * ) Notice: Subject to any disclaimer, the term of this patent is extended or adjusted under 35 U.S.C. 154(b) by 9 days.

(21) Appl. No.: 10/343,848

(22) PCT Filed: Aug. 22, 2001

(86) PCT No.: PCT/EP01/09698

§ 371 (c)(1),
(2), (4) Date: Apr. 10, 2003

(87) PCT Pub. No.: WO02/16461

PCT Pub. Date: Feb. 28, 2002

(65) Prior Publication Data

US 2003/0181539 A1 Sep. 25, 2003

(30) Foreign Application Priority Data

Aug. 24, 2000 (DE) .......................... 100 41 636

(51) Int. Cl.$^7$ ................................. C08J 3/24
(52) U.S. Cl. .................... 526/194; 526/328; 526/329.1; 526/329.2; 526/318.42
(58) Field of Search ................. 526/194, 328, 526/329.1, 329.2, 318.42

(56) References Cited

U.S. PATENT DOCUMENTS

| 4,288,527 A | | 9/1981 | Morgan ....................... 430/288 |
| 4,352,723 A | * | 10/1982 | Morgan ........................ 522/21 |
| 4,698,113 A | * | 10/1987 | Ogawa ..................... 156/275.7 |
| 5,486,384 A | * | 1/1996 | Bastian et al. ............... 427/493 |
| 2002/0198314 A1 | | 12/2002 | Meisenburg et al. ........ 524/589 |

FOREIGN PATENT DOCUMENTS

| CA | 2079498 | 9/1992 | ............ B05D/3/06 |
| EP | 0 540 884 | 10/1992 | ............ B05D/3/06 |

OTHER PUBLICATIONS

BASF Corp., U.S. Appl. No. 10/276,956, filed Nov. 19, 2002, entitled Transparent coating powder Dispersions (transparent coating powder slurry), method for the production and use thereof. pp. 1–71 and the abstract.

BASF Corp., U.S. Appl. No. 10/130,934, filed May 23, 2002, entitled Compositions curable thermally and with actinic radiation, and their use pp. 1–59 and abstract.

English Abstract for EP 0 540 884.

English Abstract for EP 0 928 800.

* cited by examiner

*Primary Examiner*—David W. Wu
*Assistant Examiner*—Satya Sastri

(57) ABSTRACT

A heat-curable composition comprising
  (I) at least one constituent whose molecule comprises on average
    (A) at least one functional group containing at least one bond which may be activated by means of heat and/or actinic radiation, and/or
    (B) at least one reactive functional group which is able to undergo thermal crosslinking reactions with groups of its own kind and/or with complementary reactive functional groups,
  with the proviso that there are always groups (A) and (B) in the composition;
  said constituent excluding the polyurethane dispersion synthesized from aliphatic polyisocyanates, compounds containing isocyanate-reactive functional groups and containing bonds that may be activated with actinic radiation, low molecular mass aliphatic compounds containing isocyanate-reactive functional groups, compounds containing isocyanate-reactive functional groups and dispersing functional groups, neutralizing agents for the dispersing functional groups, blocking agents for isocyanate groups, and/or compounds containing blocked isocyanate groups, the blocked isocyanate groups being introduced into the polyurethane dispersion by the reaction of the blocking agents with isocyanato-containing polyurethane prepolymers; and
  (II) from 0.5 to 15% by weight, based on the solids of the heat-curable composition, of at least one C-C-cleaving initiator.

18 Claims, No Drawings

THERMALLY SETTING SUBSTANCE MIXTURE AND USE THEREOF

This application is a National Phase Application of Patent Application PCT/EP01/09698 filed on 22. Aug. 2001.

The present invention relates to a novel heat-curable composition and to its use to prepare novel coating materials, adhesives, and sealing compounds. Furthermore, the present invention relates to the use of the novel coating materials, adhesives, and sealing compounds to produce novel coats, adhesive films, and seals.

Coating materials, adhesives and sealing compounds curable with both heat and actinic radiation (dual-cure coating materials, adhesives, and sealing compounds) are increasingly gaining interest since they offer numerous advantages.

Firstly, for instance, dual-cure coating materials are more suited to the coating of heat-sensitive substrates than are coating materials curable by means of heat only, since in the dual-cure systems any incomplete heat-curing at low temperatures may be compensated by curing with actinic radiation, resulting overall in coatings having good performance properties. Secondly, dual-cure coating materials are more suited to coating three-dimensional substrates of complex shape than are coating materials curable with actinic radiation only, since incomplete radiation curing in the shadow regions of the substrates may be compensated by heat curing, resulting overall, here again, in coatings having good performance properties.

The same applies, mutatis mutandis, to the dual-cure adhesives and sealing compounds as well.

In the context of the present invention, actinic radiation is electromagnetic radiation such as near infrared (NIR), visible light, UV radiation and X-rays, or corpuscular radiation such as electron beams.

Coating materials comprising
(I) at least one constituent whose molecule comprises on average
(A) at least one functional group containing at least one bond which may be activated by means of heat and/or actinic radiation, and/or
(B) at least one reactive functional group which is able to undergo thermal crosslinking reactions with groups of its own kind and/or with complementary reactive functional groups,
with the proviso that there are always groups (A) and (B), are known.

For instance, European Patent Application EP 0 928 800 A1 discloses a dual-cure coating material comprising a urethane (meth)acrylate containing free isocyanate groups and (meth)acryloyl groups, a photoinitiator, and an isocyanate-reactive compound, especially a polyol or polyamine. The free isocyanate groups and the isocyanate-reactive functional groups of the compound are complementary reactive functional groups which are able to undergo thermal crosslinking reactions. This dual-cure coating material offers the possibility of varying the profiles of properties of both coating material and coating and of adapting them to different end uses. Curing the known dual-cure coating material by means of heat alone is not described in the patent application.

The American Patent U.S. Pat. No. 4,288,527 A discloses a liquid dual-cure coating material which is cured with heat and actinic radiation. It comprises at least one liquid multifunctional olefinically unsaturated monomer, a photoinitiator, and a substituted or unsubstituted pinacol. The dual-cure coating material does not contain any reactive functional groups which undergo thermal crosslinking reactions with groups of their own kind or with complementary reactive functional groups. Accordingly, the dual-cure coating material known from said patent is not a dual-cure coating material the in the sense of the present invention. Moreover, the patent does not reveal whether the dual-cure coating material it discloses provides serviceable coatings by means of heat curing alone.

Despite all the advantages of the dual-cure coating materials known to date, there remains one key disadvantage, namely that in the case of the coating of complex three-dimensional articles such as automobile bodies for example, curing with actinic radiation is complicated by the need to use special movable exposure apparatus. It is therefore highly desirable to have available a dual-cure coating material which if necessary may be cured by means of heat alone without the particular advantages of the coating material being lost from the coating.

German Patent Application DE 199 58 726.4, unpublished at the priority date of the present specification, discloses a dual-cure coating material of the type specified at the outset. It comprises the polyurethane dispersion which is synthesized from aliphatic polyisocyanates, compounds having isocyanate-reactive functional groups and having bonds that may be activated with actinic radiation, low molecular mass aliphatic compounds containing isocyanate-reactive functional groups, compounds containing isocyanate-reactive functional groups and dispersing functional groups, neutralizing agents for the dispersing functional groups, blocking agents for isocyanate groups, and/or compounds containing blocked isocyanate groups, the blocked isocyanate groups being introduced into the polyurethane dispersion by the reaction of the blocking agents with isocyanato-containing polyurethane prepolymers. This dual-cure coating material may also be cured by means of heat alone. Furthermore, in addition to numerous other thermally labile free-radical initiators, it may also include C-C-cleaving initiators such as benzpinacol silyl ether in an amount of from 0.1 to 10% by weight based on the total amount of the dispersion. However, the use of mixtures of monomeric and oligomeric benzpinacol silyl ethers is not described therein.

German Patent Application DE 199 61 926.3, unpublished at the priority date of the present specification, describes a dual-cure coating material of the type specified at the outset. It comprises at least one constituent having on average per molecule at least one primary or secondary carbamate group (reactive functional group) and at least one bond that may be activated with actinic radiation. Complementary reactive functional groups mentioned include N-methylol and N-methylol ether groups. The dual-cure coating material may likewise include thermally labile free-radical initiators such as C-C-cleaving initiators such as benzpinacol silyl ether. However, there is neither any indication of the amounts in which they are to be used nor any description of the use of mixtures of monomeric and oligomeric benzpinacol silyl ethers.

The same applies to the dual-cure coating material described in German Patent Application DE 100 27 292.4, unpublished at the priority date of the present specification.

It is an object of the present invention to find a new heat-curable composition of the type described at the outset which may be used with advantage as a coating material, adhesive, and sealing compound or to prepare such. The new heat-curable composition and the new heat-curable coating materials, adhesives and sealing compounds should provide coats, adhesive films and seals by curing by means of heat alone which are as good if not better than those from dual curing. Moreover, the new coats should be abrasion-resistant, scratch-resistant, and of high gloss.

Accordingly, we have found the novel heat-curable composition comprising
(I) at least one constituent whose molecule comprises on average
(A) at least one functional group containing at least one bond which may be activated by means of heat and/or actinic radiation, and/or
(B) at least one reactive functional group which is able to undergo thermal crosslinking reactions with groups of its own kind and/or with complementary reactive functional groups,
with the proviso that there are always groups (A) and (B) in the composition;
said constituent excluding the polyurethane dispersion synthesized from aliphatic polyisocyanates, compounds containing isocyanate-reactive functional groups and containing bonds that may be activated with actinic radiation, low molecular mass aliphatic compounds containing isocyanate-reactive functional groups, compounds containing isocyanate-reactive functional groups and dispersing functional groups, neutralizing agents for the dispersing functional groups, blocking agents for isocyanate groups, and/or compounds containing blocked isocyanate groups, the blocked isocyanate groups being introduced into the polyurethane dispersion by the reaction of the blocking agents with isocyanato-containing polyurethane prepolymers; and
(II) from 0.5 to 15% by weight, based on the solids of the heat-curable composition, of at least one C-C-cleaving initiator.

In the text below, this novel heat-curable composition is referred to as the "composition I of the invention".

Further, we have found the novel heat-curable composition comprising
(I) at least one constituent whose molecule comprises on average
(A) at least one functional group containing at least one bond which may be activated by means of heat and/or actinic radiation, and/or
(B) at least one reactive functional group which is able to undergo thermal crosslinking reactions with groups of its own kind and/or with complementary reactive functional groups,
with the proviso that there are always groups (A) and (B) in the composition; and
(II) a mixture of monomeric and oligomeric benzpinacol silyl ethers.

In the text below, this novel heat-curable composition is referred to as the "composition II of the invention".

In the light of the prior art it was surprising and unexpected for the skilled worker that the object on which the present invention was based might be achieved with the aid of the compositions I and II of the invention. A particular surprise was that the coating materials, adhesives, and sealing compounds based on the compositions I and II of the invention, cured by means of heat alone, gave coats, adhesive films, and seals whose profile of performance properties was at least as good as that of the coats, adhesive films, and seals produced by dual curing. An even greater surprise was that the coatings heat-cured in the presence of photoinitiators showed a particularly high gloss.

The composition I of the invention comprises as a constituent essential to the invention at least one C-C-cleaving initiator in an amount of from 0.5 to 15, preferably from 1.0 to 8, more preferably from 1.5 to 7, with particular preference from 2.0 to 6.0, and in particular from 2.0 to 5.0% by weight, based in each case on the solids of the compositions I and II of the invention.

In the context of the present invention, here and below, the solids is understood to be the sum of the constituents of a heat-curable composition which following heat curing constitute the solid matter of the resultant products, for example, the coats, adhesive films, or seals.

As C-C-cleaving initiators it is preferred to use benzpinacols. Examples of suitable benzpinacols are benzpinacol silyl ether or the substituted and unsubstituted benzpinacols, as described in the American Patent U.S. Pat. No. 4,288,527 A in column 3 lines 5 to 44. It is preferred to use benzpinacol silyl ethers, especially mixtures of monomeric and oligomeric benzpinacol silyl ethers.

Mixtures of benzpinacol silyl ethers of the general formulae I and II are particularly suitable:

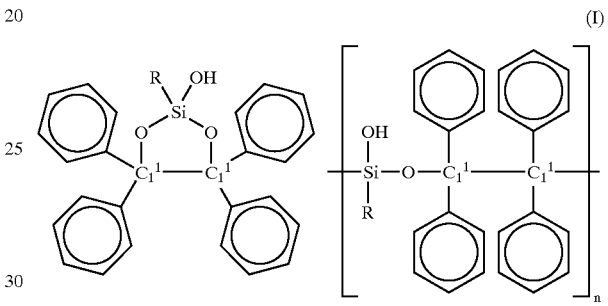

In the general formulae I and II, the variable R of the general formulae I and II is an alkyl radical of 1 to 18 carbon atoms, a cycloalkyl radical of 3 to 10 carbon atoms, an aryl radical of 6 to 12 carbon atoms, and/or an arylalkyl groups of 7 to 30 carbon atoms.

Examples of suitable alkyl radicals are methyl, ethyl, propyl, isopropyl, n-butyl, isobutyl, tert-butyl, n-pentyl, amyl, hexyl, pentyl, octyl, nonyl and decyl, especially methyl.

Examples of suitable cycloalkyl radicals are cyclopropyl, cyclobutyl, cyclopentyl, cyclohexyl, cycloheptyl, norbornenyl, cyclobutyl and decalin, especially cyclohexyl.

Examples of suitable aryl radicals are phenyl, naphthyl and biphenylyl, especially phenyl.

Examples of suitable arylalkyl radicals are tolyl, xylyl, 4-tert-butylphen-1-yl, 4-nonylphen-1-yl, benzyl, 4-phenylcyclohex-1-yl and 4-phenylprop-1-yl.

With particular preference, methyl radicals are used.

The index of the general formula II stands for a whole number from 2 to 100, in particular from 3 to 50.

The mixtures of the benzpinacol silyl ethers I and II are customary and known compounds and are sold, for example, under the brand name ADDID® 900 by the company Wacker.

In the compositions II of the invention, only these mixtures of the benzpinacol silyl ethers I and II are present.

The compositions I and II of the invention comprise at least one constituent whose molecule comprises on average at least one functional group (A) containing at least one bond which may be activated by heat and/or actinic radiation, and/or at least one reactive functional group (B) which is able to undergo thermal crosslinking reactions with groups of its own kind and/or with complementary reactive functional groups.

An essential factor here is that there must always be groups (A) and (B) in the compositions I and II of the invention.

This means that the compositions I and II of the invention comprise at least one constituent containing at least one group (A) and at least one group (B), or that the compositions I and II of the invention comprise at least one constituent containing at least one group (A) and at least one constituent containing at least one group (B).

Furthermore, the compositions I and II of the invention may comprise at least one constituent containing at least one group (A), at least one constituent containing at least one group (B), and at least one constituent containing at least one group (A) and at least one group (B).

In the constituents for use in accordance with the invention there are preferably at least two, more preferably at least three, and in particular at least four groups (A) and/or at least two, preferably at least three and in particular at least four groups (B).

The functional groups (A) contain at least one, especially one, bond which may be activated by heat and/or actinic radiation.

In the context of the present invention, a bond which may be activated by heat and/or actinic radiation is a bond which on exposure to actinic radiation and/or on supply of thermal energy becomes reactive and, with other activated bonds of its kind, undergoes polymerization reactions and/or crosslinking reactions which proceed in accordance with free-radical and/or ionic mechanisms. Examples of suitable bonds are carbon-hydrogen single bonds and carbon-carbon, carbon-oxygen, carbon-nitrogen, carbon-phosphorus or carbon-silicon single bonds or double bonds. Of these, the carbon-carbon double bonds are particularly advantageous and are therefore used with very particular preference in accordance with the invention. For brevity, they are referred to below as "double bonds".

Accordingly, the functional group (A) preferred in accordance with the invention contains one double bond or two, three, or four double bonds. If more than one double bond is used, the double bonds may be conjugated. In accordance with the invention however, it is of advantage if the double bonds are present in isolation, in particular each terminally, in the group in question. In accordance with the invention it is of particular advantage to use two, especially one, double bond(s).

If on average more than one functional group (A) per molecule is employed, the groups are structurally different from one another or of the same structure.

Where they are structurally different from one another, this means in the context of the present invention that two, three, four or more, but especially two, functional groups (A) are used which are derived from two, three, four or more, but especially two, classes of monomer.

Examples of suitable functional groups (A) are (meth) acrylate, ethacrylate, crotonate, cinnamate, vinyl ether, vinyl ester, dicyclopentadienyl, norbornenyl, isoprenyl, isopropenyl, allyl and butenyl groups; dicyclopentadienyl ether, norbornenyl ether, isoprenyl ether, isopropenyl ether, allyl ether and butenyl ether groups; and dicyclopentadienyl ester, norbornenyl ester, isoprenyl ester, isopropenyl ester, allyl ester and butenyl ester groups, but especially acrylate groups.

Preferably, the functional groups (A) are attached to the respective parent structures of the binders by way of urethane, urea, allophanate, ester, ether and/or amide groups, but especially by way of ester groups. Normally this is done by means of customary and known polymer-analogous reactions, such as, for instance, the reaction of pendant glycidyl groups with the below-described olefinically unsaturated monomers containing an acid group; of pendant hydroxyl groups with halides of these monomers; of hydroxyl groups with isocyanates containing double bonds such as vinyl isocyanate, methacryloyl isocyanate and/or 1-(1-isocyanato-1-methylethyl)-3-(1-methylethenyl) benzene (TMI® from the company CYTEC); or of isocyanate groups with the hydroxyl-containing monomers described below.

The reactive functional groups (B) are able to undergo, with groups (B) of their own kind (i.e., "with themselves") and/or with complementary reactive functional groups (B), thermal crosslinking reactions which in contrast to the reactions of the functional groups (A) proceed predominantly or wholly in accordance with a non-free-radical mechanism.

Where the constituents contain reactive functional groups (B) which react with themselves, they have self-crosslinking properties.

Where the constituents contain reactive functional groups (B) which react with complementary reactive functional groups (B), they have externally crosslinking properties.

Examples of suitable complementary reactive functional groups (B) are compiled in the overview below. In the overview, the variable $R^1$ is an acyclic or cyclic aliphatic, an aromatic, and/or an aromatic-aliphatic (araliphatic) radical; the variables $R^2$ and $R^3$ are identical or different aliphatic radicals, or are linked with one another to form an aliphatic or heteroaliphatic ring.

Overview: Examples of Complementary Functional Groups Binder and Crosslinking Agent or Crosslinking Agent and Binder

| | |
|---|---|
| —SH | —C(O)—OH |
| —NH$_2$ | —C(O)—O—C(O)— |
| —OH | —NCO |
| —O—(CO)—NH—(CO)—NH$_2$ | —NH—C(O)—OR$^1$ |
| —O—(CO)—NH$_2$ | —CH$_2$—OH |
| >NH | —CH$_2$—OR$^1$ |
| | —NH—CH$_2$—OR$^1$ |
| | —NH—CH$_2$—OH |
| | —N(—CH$_2$—OR$^1$)$_2$ |
| | —NH—C(O)—CH(—C(O)—OR$^1$)$_2$ |
| | —NH—C(O)—CH(—C(O)OR$^1$)(—C(O)—R$^1$) |
| | —NH—C(O)—NR$^2$R$^3$ |
| | >Si(OR$^1$)$_2$ |

-continued

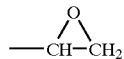

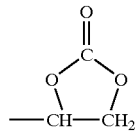

—C(O)—OH

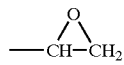

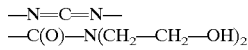
—C(O)—N(CH$_2$—CH$_2$—OH)$_2$

The selection of the respective complementary reactive functional groups (B) is guided on the one hand by the consideration that during the preparation, storage, application, and, if appropriate, the melting of the compositions III of the invention they must not undergo any unwanted reactions, in particular any premature crosslinking, and on the other hand by the temperature range within which crosslinking is to take place.

With the compositions I and II of the invention it is preferred to employ crosslinking temperatures of from 100 to 200° C.

On the one hand, therefore, it is preferred to use thio, hydroxyl, amino, N-methylolamino, N-alkoxymethylamino, imino, carbamate, allophanate and/or carboxyl groups and, on the other hand, anhydride, epoxy, blocked and unblocked isocyanate, urethane, methylol, methylol ether, siloxane, carbonate and/or beta-hydroxyalkylamide groups.

In the case of self-crosslinking compositions I and II of the invention, the constituents include, in particular, methylol, methylol ether and/or N-alkoxymethylamino groups.

The constituents containing the above-described groups (A) and/or (B) are low molecular mass compounds, oligomers, and/or polymers.

Examples of suitable oligomers and/or polymers are random, alternating and/or block linear and/or branched and/or comb (co)polymers of ethylenically unsaturated monomers, polyaddition resins and/or polycondensation resins. They are also referred to by those in the art as binders. For further details of these terms, reference is made to R ömpp Lexikon Lacke und Druckfarben, Georg Thieme Verlag, Stuttgart, New York, 1998, page 457, "Polyaddition" and "Polyaddition resins (polyadducts)", and also pages 463 and 464, "Polycondensates", "Polycondensation", and "Poly-condensation resins", and also pages 73 and 74, "Binders".

Examples of suitable (co)polymers are (meth)acrylate (co)polymers or partially hydrolyzed polyvinyl esters, especially (meth)acrylate copolymers.

Examples of suitable polyaddition resins and/or polycondensation resins are polyesters, alkyds, polyurethanes,, polylactones, polycarbonates, polyethers, epoxy resin-amine adducts, polyureas, polyamides polyimides, polyester-polyurethanes, polyether-polyurethanes or polyester-polyether-polyurethanes, especially polyester-polyurethanes.

Of these binders, the (meth)acrylate copolymers and the polyester-polyurethanes have particular advantages and are therefore used with particular preference.

Examples of suitable olefinically unsaturated monomers (b) for preparing the (meth)acrylate copolymers are
 (b1) monomers bearing for example at least one hydroxyl, amino, alkoxymethylamino, carbamate, allophanate, or imino group per molecule, by means of which the above-described complementary reactive functional groups (B) are introduced into the constituents, such as N,N-di(methoxymethyl)aminoethyl acrylate or methacrylate or N,N-di(butoxymethyl)aminopropyl acrylate or methacrylate;
 (meth)acrylamides such as (meth)acrylamide, N-methyl-, N-methylol-, N,N-dimethylol-, N-methoxymethyl-, N,N-di(methoxymethyl)-, N-ethoxymethyl- and/or N,N-di(ethoxyethyl)(meth) acrylamide;
 acryloyloxy- or methacryloyloxyethyl, -propyl or -butyl carbamate or allophanate; further examples of suitable monomers containing carbamate groups are described in patents U.S. Pat. No. 3,479,328 A1, U.S. Pat. No. 3,674,838 A1, U.S. Pat. No. 4,126,747 A1, U.S. Pat. No. 4,279,833 A1, and U.S. Pat. No. 4,340,497 A1; and/or
 hydroxyalkyl esters of acrylic acid, methacrylic acid or another alpha,beta-olefinically unsaturated carboxylic acid, which are derived from an alkylene glycol which is esterified with the acid, or which are obtainable by reacting the alpha,beta-olefinically unsaturated carboxylic acid with an alkylene oxide such as ethylene oxide or propylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; or hydroxycycloalkyl esters such as1,4-bis(hydroxy-methyl)cyclohexane, octahydro-4,7-methano-1H-indenedimethanol or methylpropanediol monoacrylate, monomethacrylate, monoethacrylate, monocrotonate, monomaleate, monofumarate or monoitaconate; reaction products of cyclic esters, such as epsilon-caprolactone, for example, and these hydroxyalkyl or hydroxycycloalkyl esters;
 olefinically unsaturated alcohols such as allyl alcohol;
 polyols such as trimethylolpropane monoallyl or diallyl ether or pentaerythritol monoallyl, diallyl or triallyl ether;

reaction products of acrylic acid and/or methacrylic acid with the glycidyl ester of an alpha-branched monocarboxylic acid of 5 to 18 carbon atoms per molecule, especially a Versatic® acid, or, instead of the reaction product, an equivalent amount of acrylic and/or methacrylic acid which is then reacted during or after the polymerization reaction with the glycidyl ester of an alpha-branched monocarboxylic acid of 5 to 18 carbon atoms per molecule, especially a Versatic® acid;

aminoethyl acrylate, aminoethyl methacrylate, allylamine or N-methyliminoethyl acrylate; and/or acryloyloxysilane-containing vinyl monomers, preparable by reacting hydroxy-functional silanes with epichlorohydrin and then reacting that reaction product with (meth)acrylic acid and/or hydroxyalkyl and/or hydroxycycloalkyl esters of (meth)acrylic acid and/or further hydroxyl-containing monomers (b1).

(b2) Monomers which carry at least one acid group per molecule, such as acrylic acid, methacrylic acid, ethacrylic acid, crotonic acid, maleic acid, fumaric acid or itaconic acid;

olefinically unsaturated sulfonic or phosphonic acids or their partial esters;

mono(meth)acryloyloxyethyl maleate, succinate or phthalate; or vinylbenzoic acid (all isomers), alpha-methylvinylbenzoic acid (all isomers) or vinylbenzenesulfonic acid (all isomers).

(b3) Monomers which are essentially or completely free from reactive functional groups, such as:

Monomers (b31)

(Meth)acrylic esters which are essentially free from acid groups, such as (meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indenemethanol or tert-butylcyclohexyl (meth)acrylate; (meth)acrylic oxaalkyl or oxacycloalkyl esters such as ethoxytriglycol (meth)acrylate and methoxyoligoglycol (meth)acrylate having a molecular weight Mn of preferably 550 or other ethoxylated and/or propoxylated, hydroxyl-free (meth)acrylic acid derivatives (further examples of suitable monomers (b31) of this kind are known from the laid-open specification DE 196 25 773 A1, column 3 line 65 to column 4 line 20). In minor amounts they may contain higher-functional (meth)acrylic alkyl or cycloalkyl esters such as ethylene glycol, propylene glycol, diethylene glycol, dipropylene glycol, butylene glycol, 1,5-pentanediol, 1,6-hexanediol, octahydro-4,7-methano-1H-indenedimethanol or cyclohexane-1,2-, -1,3- or -1,4-diol di(meth)acrylate; trimethylolpropane di- or tri(meth)acrylate; or pentaerythritol di-, tri- or tetra(meth)acrylate. Context of the present invention, minor amounts of higher-functional monomers (b31) are amounts which do not lead to crosslinking or gelling of the copolymers, unless the intention is that they should be present in the form of crosslinked microgel particles.

Monomers (b32)

Vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may comprise branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Other olefinic starting materials are, for example, propylene trimer, propylene tetramer and diisobutylene. Alternatively, the vinyl esters may be prepared in a conventional manner from the acids, for example, by reacting the acid with acetylene. Particular preference, owing to their ready availability, is given to the use of vinyl esters of saturated aliphatic monocarboxylic acids having 9 to 11 carbon atoms which are branched on the alpha carbon atom. Vinyl esters of this kind are sold under the brand name VeoVa® (cf. also Römpp Lexikon Lacke und Druckfarben, Georg Thieme Verlag, Stuttgart, New York, 1998, page 598).

Monomers (b33)

Diarylethylenes, especially those of the general formula III:

$$R^4R^5C=CR^6R^7 \qquad (III),$$

in which the radicals $R^4$, $R^5$, $R^6$ and $R^7$ in each case independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^4$, $R^5$, $R^6$ and $R^7$ are substituted or unsubstituted aryl, arylalkyl or arylcycloalkyl radicals, especially substituted or unsubstituted aryl radicals. Examples of suitable alkyl radicals are methyl, ethyl, propyl, isopropyl, n-butyl, isobutyl, tert-butyl, amyl, hexyl or 2-ethylhexyl. Examples of suitable cycloalkyl radicals are cyclobutyl, cyclopentyl or cyclohexyl. Examples of suitable alkylcycloalkyl radicals are methylenecyclohexane, ethylenecyclohexane or propane-1,3-diylcyclohexane. Examples of suitable cycloalkylalkyl radicals are 2-, 3- or 4-methyl-, -ethyl-, -propyl- or -butylcyclohex-1-yl. Examples of suitable aryl radicals are phenyl, naphthyl or biphenylyl, preferably phenyl and naphthyl and especially phenyl. Examples of suitable alkylaryl radicals are benzyl or ethylene- or propane-1,3-diylbenzene. Examples of suitable cycloalkylaryl radicals are 2-, 3- or 4-phenylcyclohex-1-yl. Examples of suitable arylalkyl radicals are 2-, 3- or 4-methyl-, -ethyl-, -propyl- or -butylphen-1-yl. Examples of suitable arylcycloalkyl radicals are 2-, 3- or 4-cyclohexylphen-1-yl. The aryl radicals $R^4$, $R^5$, $R^6$ and/or $R^7$ are preferably phenyl or naphthyl radicals, especially phenyl radicals. The substituents that may be present in the radicals $R^4$, $R^5$, $R^6$ and/or $R^7$ are electron-withdrawing or electron-donating atoms or organic radicals, especially halogen atoms, nitrile, nitro, partially or fully halogenated alkyl, cycloalkyl, alkylcycloalkyl, cycloalkylalkyl, aryl, alkylaryl, cycloalkylaryl, arylalkyl and arylcycloalkyl radicals; aryloxy, alkyloxy and cycloalkyloxy radicals; and/or arylthio, alkylthio and cycloalkylthio radicals. Diphenylethylene, dinaphthaleneethylene, cis- or trans-stilbene or vinylidene-bis(4-nitrobenzene), especially diphenylethylene (DPE), are particularly advantageous and so are used with preference. In the context of the present invention, the monomers (b33) are used in order to regulate the copolymerization advantageously such that batchwise free-radical copolymerization is also possible.

Monomers (b34)

Vinylaromatic hydrocarbons such as styrene, vinyltoluene, diphenylethylene or alpha-alkylstyrenes, especially alpha-methylstyrene.

Monomers (b35)

Nitriles such as acrylonitrile and/or methacrylonitrile.

Monomers (b36)

Vinyl compounds, especially vinyl halides and/or vinylidene dihalides, such as vinyl chloride, vinyl fluoride, vinylidene dichloride or vinylidene difluoride; N-vinylamides such as vinyl-N-methylformamide, N-vinylcaprolactam or N-vinylpyrrolidone; 1-vinylimidazole; vinyl ethers such as ethyl vinyl ether, n-propyl vinyl ether, isopropyl vinyl ether, n-butyl vinyl ether, isobutyl vinyl ether and/or vinyl cyclohexyl ether; and/or vinyl esters such as vinyl acetate, vinyl propionate, vinyl butyrate, vinyl pivalate and/or the vinyl ester of 2-methyl-2-ethylheptanoic acid.

Monomers (b37)

Allyl compounds, especially allyl ethers and allyl esters such as allyl methyl, ethyl, propyl or butyl ether or allyl acetate, propionate or butyrate.

Monomers (b38):

Polysiloxane macromonomers having a number-average molecular weight Mn of from 1000 to 40,000 and having on average from 0.5 to 2.5 ethylenically unsaturated double bonds per molecule; especially polysiloxane macromonomers having a number-average molecular weight Mn of from 2000 to 20,000, with particular preference from 2500 to 10,000, and in particular from 3000 to 7000 and having on average from 0.5 to 2.5, preferably from 0.5 to 1.5, ethylenically unsaturated double bonds per molecule, as are described in DE 38 07 571 A1 on pages 5 to 7, in DE 37 06 095 A1 in columns 3 to 7, in EP 0 358 153 B1 on pages 3 to 6, in U.S. Pat. No. 4,754,014 A1 in columns 5 to 9, in DE 44 21 823 A1 or in International Patent Application WO 92/22615 on page 12 line 18 to page 18 line 10.

Monomers (b39)

Olefins such as ethylene, propylene, but-1-ene, pent-1-ene, hex-1-ene, cyclohexene, cyclopentene, norbornene, butadiene, isoprene, cyclopentadiene and/or dicyclopentadiene. and/or (b4) Monomers containing epoxide groups, such as the glycidyl ester of acrylic acid, methacrylic acid, ethacrylic acid, crotonic acid, maleic acid, fumaric acid or itaconic acid, or allyl glycidyl ether.

Higher-functional monomers of the type described above are generally used in minor amounts. In the context of the present invention, minor amounts of higher-functional monomers are those amounts which do not lead to crosslinking or gelling of the (meth)acrylate copolymers, unless the specific aim is to prepare crosslinked polymeric microparticles.

Examples of suitable processes for preparing (meth)acrylate copolymers are described in European Patent Application EP 0 767 185 A1, in German patents DE 22 14 650 B1 and DE 27 49 576 B1, and in the American patents U.S. Pat. No. 4,091,048 A1, U.S. Pat. No. 3,781,379 A1, U.S. Pat No. 5,480,493 A1, U.S. Pat. No. 5,475,073 A1 and U.S. Pat. No. 5,534,598 A1, and in the standard work Houben-Weyl, Methoden der organischen Chemie, 4th Edition, volume 14/1, pages 24 to 255, 1961. Suitable reactors for the copolymerization are the customary and known stirred vessels, cascades of stirred vessels, tube reactors, loop reactors or Taylor reactors, as described for example in patents and patent applications DE 1 071 241 B1, EP 0 498 583 A1 and DE 198 28 742 A1 and in the article by K. Kataoka in Chemical Engineering Science, volume 50, number 9, 1995, pages 1409 to 1416.

Functional groups (A) may be introduced by polymer-analogous reaction of the above-described (meth)acrylate copolymers with appropriate compounds containing bonds that may be activated by actinic radiation. For example, any pendant glycidyl groups that may be present on the (meth)acrylate copolymers may be reacted with (meth)acrylic acid.

The preparation of polyurethanes containing functional groups (B) and/or acrylated polyurethanes containing functional groups (B) and (A) is described, for example, in Patent Applications EP 0 089 497 A1, EP 0 256 540 A1, EP 0 260 447 A1, EP 0 297 576 A1, WO 96/12747, EP 0 523 610 A1, EP 0 228 003 A1, EP 0 397 806 A1, EP 0 574 417 A1, EP 0 531 510 A1, EP 0 581 211 A1, EP 0 708 788 A1, EP 0 593 454 A1, DE-A-43 28 092 A1, EP 0 299 148 A1, EP 0 394 737 A1, EP 0 590 484 A1, EP 0 234 362 A1, EP 0 234 361 A1, EP 0 543 817 A1, WO 95/14721, EP 0 521 928 A1, EP 0 522 420 A1, EP 0 522 419 A1, EP 0 649 865 A1, EP 0 536 712 A1, EP 0 596 460 A1, EP 0 596 461 A1, EP 0 584 818 A1, EP 0 669 356 A1, EP 0 634 431 A1, EP 0 678 536 A1, EP 0 354 261 A1, EP 0 424 705 A1, WO 97/49745, WO 97/49747, EP 0 401 565 A1 and EP 0 817 684, column 5 lines 31 to 45, EP 0 708 788 A1, DE 44 01 544 A1 and DE 195 34 361 A1.

Examples of especially suitable polyurethanes and polyurethane dispersions containing functional groups (A) and (B) are described in German Patent Applications DE 199 47 054.5 and DE 199 58 726.4, unpublished at the priority date of the present specification.

The polyurethanes are synthesized from aliphatic polyisocyanates, compounds containing isocyanate-reactive functional groups and containing bonds that may be activated by actinic radiation, low molecular mass aliphatic compounds containing isocyanate-reactive functional groups, compounds containing isocyanate-reactive functional groups and dispersing functional groups, neutralizing agents for the dispersing functional groups, blocking agents for isocyanate groups, and/or compounds containing blocked isocyanate groups, the blocked isocyanate groups being introduced into the polyurethane dispersion by the reaction of the blocking agents with isocyanato-containing polyurethane prepolymers.

Preference is given to at least one aliphatic—including cycloaliphatic—polyisocyanate having an isocyanate functionality of from 2.0 to 6.0, preferably from 2.0 to 5.0, preferably from 2.0 to 4.5, and in particular from 2.0 to 3.5. In the context of the present invention, a cycloaliphatic diisocyanate is a diisocyanate in which at least one isocyanate group is attached to a cycloaliphatic radical.

Examples of suitable cycloaliphatic polyisocyanates having an isocyanate functionality of 2.0 are isophorone diisocyanate (i.e., 5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl) cyclohexane, 1-isocyanato-2-(4-isocyanatobut-1-yl) cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclo-hexane, dicyclohexylmethane 2,4'-diisocyanate or dicyclohexylmethane 4,4'-diisocyanate, especially isophorone diisocyanate.

Examples of suitable acyclic aliphatic diisocyanates having an isocyanate functionality of 2.0 are trimethylene diisocyanate, tetramethylene diisocyanate, pentamethylene diisocyanate, hexamethylene diisocyanate, ethylethylene diisocyanate, trimethylhexane diisocyanate, heptanemethylene diisocyanate or diisocyanates derived from dimeric fatty acids, as marketed under the commercial designation DDI 1410 by the company Henkel and described in patents WO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane.

Of these, hexamethylene diisocyanate is of particular advantage and is therefore used with very particular preference in accordance with the invention.

Examples of suitable polyisocyanates having an isocyanate functionality >2 are polyisocyanates, especially those based on hexamethylene diisocyanate, which contain isocyanurate, biuret, allophanate, iminooxadiazinedione, urethane, urea, carbodiimide and/or uretdione groups and which are obtainable in customary and known manner from the diisocyanates described above. Of these, those containing allophanate groups are of advantage and are therefore used with particular preference in accordance with the invention. Examples of suitable preparation processes and polyisocyanates are known, for example, from patents CA 2,163,591 A, U.S. Pat. No. 4,419,513 A, U.S. Pat. No. 4,454,317 A, EP 0 646 608 A1, U.S. Pat. No. 4,801,675 A, EP 0 183 976 A1, DE 40 15 155 A1, EP 0 303 150 A1, EP 0 496 208 A1, EP 0 524 500 A1, EP 0 566 037 A1, U.S. Pat. No. 5,258,482 A, U.S. Pat. No. 5,290,902 A, EP 0 649 806 A1, DE 42 29 183 A1 and EP 0 531 820 A1.

Examples of suitable compounds containing per molecule at least one, especially one, functional group and containing at least one bond that may be activated with actinic radiation are allyl alcohol or 4-butyl vinyl ether;

hydroxyalkyl esters of acrylic acid or of methacrylic acid, especially of acrylic acid, which are obtainable by esterifying aliphatic diols, for example, the low molecular mass diols B) described above, with acrylic acid or methacrylic acid or by reacting acrylic acid or methacrylic acid with an alkylene oxide, especially hydroxyalkyl esters of acrylic acid or methacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl or bis(hydroxymethyl)cyclohexane acrylate or methacrylate; of these, 2-hydroxyethyl acrylate and 4-hydroxybutyl acrylate are particularly advantageous and are therefore used with particular preference in accordance with the invention; or reaction products of cyclic esters, such as epsilon-caprolactone, for example, and these hydroxyalkyl or hydroxycycloalkyl esters.

Examples of suitable low molecular mass aliphatic compounds containing at least two, especially two, isocyanate-reactive functional groups are polyols, especially diols, polyamines, especially diamines, and amino alcohols. Normally, the polyols and/or polyamines are used in addition to the diols and/or diamines in minor amounts in order to introduce branching points into the polyurethanes. In the context of the present invention, minor amounts are amounts which do not bring about any gelling of the polyurethanes during their preparation. This applies mutatis mutandis to the amino alcohols.

Examples of suitable diols are ethylene glycol, 1,2- or 1,3-propanediol, 1,2-, 1,3- or 1,4-butanediol, 1,2-, 1,3-, 1,4- or 1,5-pentanediol, 1,2, 1,3-, 1,4-, 1,5- or 1,6-hexanediol, neopentyl hydroxypivalate, neopentyl glycol, diethylene glycol, 1,2-, 1,3- or 1,4-cyclohexanediol, 1,2-, 1,3- or 1,4-cyclohexane-dimethanol, trimethylpentanediol, ethylbutylpropanediol, the positionally isomeric diethyloctanediols, 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethylbicyclo[2.2.1]heptane, 2,2-diethyl-1,3-propanediol, 2,2-dipropyl-1,3-propanediol, 2-cyclohexyl-2-methyl-1,3-propanediol, 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, dihydroxymethylcyclohexane, bis(hydroxycyclohexyl)propane, tetramethylcyclobutanediol, cyclooctanediol and norbornanediol.

Examples of suitable polyols are trimethylolethane, trimethylolpropane and glycerol, pentaerythritol and homopentaerythritol, or sugar alcohols such as thrietol or erythritol or pentitols such as arabitol, adonitol or xylitol, or hexitols such as sorbitol, mannitol or dulcitol.

Examples of suitable diamines are hydrazine, ethylenediamine, propylenediamine, 1,4-butylenediamine, piperazine, 1,4-cyclohexyldimethylamine, 1,6-hexamethylenediamine, trimethylhexamethylenediamine, methanediamine, isophoronediamine and 4,4'-diaminodicyclohexylmethane.

Examples of suitable polyamines are diethylenetriamine, triethylenetetramine, dipropylenediamine and dibutylenetriamine.

Examples of suitable amino alcohols are ethanolamine, diethanolamine and triethanolamine.

Of these compounds, diethanolamine offers particular advantages and is therefore used with preference in accordance with the invention.

Examples of suitable compounds containing at least one isocyanate-reactive functional group and at least one dispersing functional group, in particular a (potentially) anionic group, are mercapto-, hydroxy-, amino- or imino-carboxylic acids, -phosphonic acids or -sulfonic acids such as mercaptoacetic acid (thioglycolic acid), mercaptopropionic acid, mercaptosuccinic acid, hydroxyacetic acid, hydroxydecanoic acid, hydroxydodecanoic acid, 12-hydroxystearic acid, hydroxyethanesulfonic acid, hydroxypropanesulfonic acid, mercaptoethanesulfonic acid, mercaptopropanesulfonic acid, aminopropanesulfonic acid, glycine, iminodiacetic acid, 2,2-dimethylolacetic acid, 2,2-dimethylolpropionic acid, 2,2-dimethylolbutyric acid, 2,2-dimenthylolpentanoic acid, ###,###-diaminovaleric acid, 3,4-diaminobenzoic acid, 2,4-diaminotoluenesulfonic acid and 2,4-diaminodiphenyl ether sulfonic acid. They are used in amounts such as to result in the acid numbers described above.

Examples of suitable neutralizing agents for the potentially anionic groups of the compounds described above are alkali metal and alkaline earth metal hydroxides, oxides, carbonates and hydrogen carbonates, and also ammonia and amines, such as trimethylamine, triethylamine, tributylamine, dimethylaniline, diethylaniline, triphenylamine, dimethylethanolamine, diethylethanolamine, methyldiethanolamine, 2-aminomethylpropanol, dimethylisopropylamine and dimethylisopropanolamine, for example.

Examples of suitable blocking agents are i) phenols such as phenol, cresol, xylenol, nitrophenol, chlorophenol ethylphenol, tert-butylphenol, hydroxybenzoic acid, esters of this acid, or 2,5-di-tert-butyl-4-hydroxytoluene;

ii) lactams, such as ε-caprolactam, δ-valerolactam, γ-butyrolactam or β-propiolactam;

iii) active methylenic compounds, such as diethyl malonate, dimethyl malonate, ethyl acetoacetate or methyl acetoacetate, or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;

vi) acid amides such as acetoanilide, acetoanisidinamide, acrylamide, methacrylamide, acetamide, stearamide or benzamide;

vii) imides such as succinimide, phthalimide or maleimide;

viii) amines such as diphenylamine, phenylnaphthylamine, xylidine, N-phenylxylidine, carbazole, aniline, naphthylamine, butylamine, dibutylamine or butylphenylamine;

ix) imidazoles such as imidazole or 2-ethylimidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such as ethyleneimine;

xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes;

xiv) salts of sulphurous acids such as sodium bisulfite or potassium bisulfite;

xv) hydroxamic esters such as benzyl methacrylohydroxamate (BMH) or allyl methacrylohydroxamate; or xvi) substituted pyrazoles, especially dimethylpyrazole or triazoles; and xvii) mixtures of these blocking agents, especially dimethylpyrazole and triazoles, malonic esters and acetoacetic esters, or dimethylpyrazole and succinimide.

Examples of suitable compounds other than the above-described compounds that are not polyisocyanates, and which contain an isocyanate-reactive functional group, are ethanol, propanol, n-butanol, sec-butanol, tert-butanol, amyl alcohols, hexanols, fatty alcohols, phenol, allyl alcohol and ethylhexylamine. They are preferably used in conjunction with higher-functional compounds, in particular in order to prevent the gelling of the polyurethanes during their preparation.

In the case of the compositions I of the invention, however, these polyurethane dispersions are excluded constituents.

Further suitable constituents containing at least one functional group (A) are the binders envisaged for use in UV-curable clearcoats and powder clearcoats and described in European Patent Applications EP 0 928 800 A1, EP 0 636 669 A1, EP 0 410 242 A1, EP 0 783 534 A1, EP 0 650 978 A1, EP 0 650 979 A1, EP 0 650 985 A1, EP 0 540 884 A1, EP 0 568 967 A1, EP 0 054 505 A1 and EP 0 002 866 A1, in German Patent Applications DE 197 09 467 A1, DE 42 03 278 A1, DE 33 16 593 A1, DE 38 36 370 A1, DE 24 36 186 A1 and DE 20 03 579 B1, in International Patent Applications WO 97/46549 and WO 99/14254, and in the American Patents U.S. Pat. No. 5,824,373 A, U.S. Pat. No. 4,675,234 A, U.S. Pat. No. 4,634,602 A, 4,424,252 A, U.S. Pat. No. 4,208,313 A, U.S. Pat. No. 4,163,810 A, U.S. Pat. No. 4,129,488 A, U.S. Pat. No. 4,064,161 A and U.S. Pat. No. 3,974,303 A.

The amount of the above-described oligomeric and polymeric constituents, i.e., of the binders, may vary very widely and is guided in particular by their functionality and by whether they are thermally self-crosslinking or externally crosslinking. In the case of thermally self-crosslinking constituents, the amount may be up to 100% by weight, based on the solids of the compositions of the invention. Where thermally externally crosslinking constituents are used, the amount, based on the solids of the compositions of the invention, is preferably from 20 to 90, more preferably from 25 to 85, with particular preference from 30 to 80, with very particular preference from 35 to 75, and in particular from 40 to 70% by weight.

The low molecular mass constituents are, in particular, heat-curable reactive diluents containing reactive functional groups (B), such as positionally isomeric diethyloctanediols or hydroxyl-containing hyperbranched compounds or dendrimers as described in German Patent Applications DE 198 05 421 A1, DE 198 09 643 A1 and DE 198 40 405 A1, or are reactive diluents curable with actinic radiation and containing functional groups (A), such as those described in Römpp Lexikon Lacke und Druckfarben, Georg Thieme Verlag, Stuttgart, New York, 1998, on page 491 under the entry "Reactive diluents".

Furthermore, the low molecular mass constituents comprise crosslinking agents containing complementary reactive functional groups (B), such as amino resins, as described for example in Römpp Lexikon Lacke und Druckfarben, Georg Thieme Verlag, 1998, page 29, "Amino resins", in the textbook "Lackadditive" [Coatings additives] by Johan Bieleman, Wiley-VCH, Weinheim, New York, 1998, pages 242 ff., in the book "Paints, Coatings and Solvents", second, completely revised edition, eds. D. Stoye and W. Freitag, Wiley-VCH, Weinheim, New York, 1998, pages 80 ff., in patents U.S. Pat. No. 4,710,542 A and EP 0 245 700 A1, and in the article by B. Singh and coworkers, "Carbamylmethylated Melamines, Novel Crosslinkers for the Coatings Industry" in Advanced Organic Coatings Science and Technology series, 1991, volume 13, pages 193 to 207, carboxyl-containing compounds or resins, as described for example in patent DE 196 52 813 A1 or 198 41 408 A1, especially 1,12-dodecanedioic acid, resins or compounds containing epoxide groups, as described for example in patents EP 0 299 420 A1, DE 22 14 650 B1, DE 27 49 576 B1, U.S. Pat. No. 4,091,048 A and U.S. Pat. No. 3,781,379 A, blocked polyisocyanates, as described for example in patents U.S. Pat. No. 4,444,954 A, DE 196 17 086 A1, DE 196 31 269 A1, EP 0 004 571 A1 and EP 0 582 051 A1, beta-hydroxyalkylamides such as N,N,N',N'-tetrakis(2-hydroxyethyl)adipamide or N,N,N',N'-tetrakis(2-hydroxypropyl)adipamide, and/or tris(alkoxycarbonylamino)triazines, as described in patents U.S. Pat. No. 4,939,213 A1, U.S. Pat. No 5,084,541 A, U.S. Pat. No. 5,288,865 A and EP 0 604 922 A1.

Furthermore, the low molecular mass constituents are crosslinking agents containing functional groups (A) and (B), as described for example in European Patent Application EP 0 928 800 A1.

The amount of low molecular mass constituents in the compositions I and II of the invention may vary widely and is guided in particular by their functionality and function. For example, based in each case on their solids, the compositions I and II of the invention contain from 10 to 80, preferably from 15 to 75, with particular preference from 20 to 70, with very particular preference from 25 to 65, and in particular from 30 to 60% by weight of the above-described crosslinking agents.

The compositions I and II of the invention may be supplied for a very wide variety of end uses. In particular, they are used as coating materials; adhesives and sealing compounds or to prepare such.

The coating materials, adhesives and sealing compounds of the invention are one-component systems or multicomponent systems. With the one-component systems of the invention, all of the constituents may be stored together without the risk of premature crosslinking. In the case of the multicomponent systems of the invention, owing to the high reactivity, at least one constituent must be stored separately from others, in order to prevent premature crosslinking. The reactive constituent is therefore added to the other constituents not until shortly before the application of the coating material, adhesive, or sealing compound.

The compositions I and II of the invention, and, respectively, the coating materials, adhesives and sealing compounds of the invention, are solventborne (conventional) or aqueous systems, essentially water- and solvent-free liquid (100%) systems, or finely divided solid systems (powder coating materials) or aqueous dispersions of powder coating materials (powder slurries).

Particular advantages are provided by the compositions I and II of the invention in their utility as coating materials. The coating material in question may be a pigmented or an unpigmented coating material. Examples of pigmented coating materials are surfacers, solid-colored topcoats or basecoats; examples of unpigmented coating materials are clearcoats. With particular preference, the compositions I and II of the invention are used as clearcoats or to prepare clearcoats, preferably multicomponent clearcoats, especially two-component clearcoats.

If the coating material is used as a surfacer, solid-colored topcoat or basecoat, it includes color and/or effect pigments as additives in customary and known amounts. The pigments may comprise organic and inorganic compounds and may provide effect and/or color. On the basis of this large number of suitable pigments, therefore, the dual-cure coating material of the invention is assured a universal breadth of application and permits the realization of a large number of color shades and optical effects.

Effect pigments which may be used include metal flake pigments such as commercial aluminum bronzes, aluminum bronzes chromated in accordance with DE 36 36 183 A1, and commercial stainless steel bronzes, and also nonmetallic effect pigments, such as pearlescent pigments and interference pigments, for example. For further details, reference is made to Römpp Lexikon Lacke und Druckfarben, Georg Thieme verlag, 1998, page 176, "Effect pigments", and pages 380 and 381, "Metal oxide-mica pigments" to "Metal pigments".

Examples of suitable inorganic color pigments are titanium dioxide, iron oxides, Sicotrans yellow and carbon black. Examples of suitable organic color pigments are thioindigo pigments, indanthrene blue, Cromophthal red, Irgazine orange and Heliogen green. For further details, reference is made to Römpp Lexikon Lacke und Druckfarben, Georg Thieme Verlag, 1998, pages 180 and 181, "Iron blue pigments" to "Black iron oxide", pages 451 to 453, "Pigments" to "Pigment volume concentration", page 563, "Thioindigo pigments", and page 567, "Titanium dioxide pigments".

Furthermore, the dual-cure coating material, especially as a surfacer, may comprise organic and inorganic fillers in customary and known, effective amounts. Examples of suitable fillers are chalk, calcium sulfate, barium sulfate, silicates such as talc or kaolin, silicas, oxides such as aluminum hydroxide or magnesium hydroxide or organic fillers such as textile fibers, cellulose fibers, polyethylene fibers or wood flour. For further details, reference is made to Römpp Lexikon Lacke und Druckfarben, Georg Thieme Verlag, 1998, pages 250 ff., "Fillers".

These pigments and fillers may also be incorporated into the dual-cure coating materials by way of pigment pastes.

The above-described pigments and fillers are omitted if the coating materials are used in their especially preferred utility as clearcoats.

Examples of suitable additives which may be present in the clearcoats, surfacers, basecoats and solid-colored topcoats are low-boiling and/or high-boiling organic solvents ("long solvents");

UV absorbers such as benzotriazoles, hydroxyphenyltriazines and/or oxalanilides and/or further light stabilizers such as HALS compounds such as N-methyl or N-amino ether 2,2,6,6-tetra-methylpiperidinyl esters;

antioxidants;

photoinitiators such as those of the Norrish II type, whose mechanism of action is based on an intramolecular variant of the hydrogen abstraction reactions, as occur diversely in photochemical reactions (reference may be made here, by way of example, to Römpp Chemie Lexikon, 9th, expanded and revised edition, Georg Thieme Verlag, Stuttgart, Vol. 4, 1991) or cationic photoinitiators (reference may be made here, by way of example, to Römpp Lexikon Lacke und Druckfarben, Georg Thieme Verlag, Stuttgart, 1998, pages 444 to 446), especially benzophenones, benzoins or benzoin ethers or phosphine oxides;

additional thermally labile free-radical initiators such as organic peroxides or organic azo compounds such as dialkyl peroxides, peroxocarboxylic acids, peroxodicarbonates, peroxide esters, hydroperoxides, ketone peroxides or azo dinitriles;

crosslinking catalysts such as dibutyltin dilaurate, dibutyltin dioleate, lithium decanoate, bismuth lactate or dimethylpropionate, or zinc octoate or strong acids such as sulfonic acids, which may have been blocked with amines;

devolatilizers, such as diazadicycloundecane;

slip additives;

polymerization inhibitors;

defoamers;

emulsifiers, especially nonionic emulsifiers such as alkoxylated alkanols, polyols, phenols and alkylphenols, or anionic emulsifiers such as alkali metal salts or ammonium salts of alkanecarboxylic acids, alkanesulfonic acids, and sulfo acids of alkoxylated alkanols, polyols, phenols and alkylphenols;

wetting agents such as siloxanes, fluorine compounds, carboxylic monoesters, phosphoric esters, polyacrylic acids and their copolymers, or polyurethanes;

adhesion promoters such as tricyclodecanedimethanol;

leveling agents;

film-forming auxiliaries such as cellulose derivatives;

transparent fillers based on silica, aluminum oxide or zirconium oxide; for further details reference is also made to Römpp Lexikon Lacke und Druckfarben, Georg Thieme Verlag, Stuttgart, 1998, pages 250 to 252; the fillers may also be present as nanoparticles and are preferably present in dispersion in the above-described reactive diluents for curing with actinic radiation;

sag control agents such as ureas, modified ureas and/or silicas, as described for example in the references EP 192 304 A1, DE 23 59 923 A1, DE 18 05 693 A1, WO 94/22968, DE 27 51 761 C1, WO 97/12945 or "farbe+lack", November 1992, pages 829 ff.;

rheology control additives, such as those known from patents WO 94/22968, EP 0 276 501 A1, EP 0 249 201 A1 or WO 97/12945; crosslinked polymeric microparticles, as disclosed for example in EP-A-0 008 127; inorganic phyllosilicates such as aluminum magnesium silicates, sodium magnesium and sodium-magnesium-fluorine-lithium phyllosilicates of the montmorillonite type; silicas such as Aerosils; or synthetic polymers containing ionic and/or associative groups such as polyvinyl alcohol, poly(meth)acrylamide, poly(meth)acrylic acid, polyvinylpyrrolidone, styrene-maleic anhydride or ethylene-maleic anhydride copolymers and their derivatives or hydrophobically modified ethoxylated urethanes or polyacrylates;

flame retardants, and/or flatting agents such as magnesium stearate.

Further examples of suitable additives are described in the textbook "Lackadditive" by Johan Bieleman, Wiley-VCH, Weinheim, New York, 1998.

The additives described above may also be present in the adhesives and sealing compounds of the invention, provided they are suitable for these end uses, which is something readily determinable by the skilled worker on the basis of his or her general knowledge in the art.

The preparation of the compositions I and II of the invention, and, respectively, of the coating materials, adhesives and sealing compounds of the invention, has no special features but instead takes place in a customary and known manner by mixing of the above-described constituents in appropriate mixing apparatus such as stirred vessels, dissolvers, stirred mills, or extruders, in accordance with the processes suitable for preparing the respective coating materials, adhesives or sealing compounds of the invention.

The adhesives of the invention are used to produce the adhesive films of the invention on primed and unprimed substrates.

The sealing compounds of the invention are used to produce the seals of the invention on and/or in primed and unprimed substrates.

The coating materials of the invention are used to produce single-coat or multicoat clearcoat systems and/or multicoat color and/or effect systems on primed and unprimed substrates. It is in this utility in particular that the coating materials of the invention prove particularly advantageous. Very special advantages result when they are used to produce clearcoats, especially as part of what is known as the wet-on-wet technique, in which a basecoat material, especially an aqueous basecoat material, is applied to the primed or unprimed substrate and dried but not cured, a clearcoat material is then applied to the basecoat film, and the resultant clearcoat film is cured together with the basecoat film, by means of heat and actinic radiation.

Suitable coating substrates are all surfaces which are not damaged by curing of the films present thereon by the combined application of heat and actinic radiation.

Suitable substrates comprise metals, plastics, wood, ceramic, stone, textile, fiber composites, leather, glass, glass fibers, glass wool, rock wool, mineral-bound and resin-bound building materials, such as plasterboards and cement slabs or roof tiles, and assemblies of these materials.

Accordingly, the coats, adhesive films or seals of the invention are also suitable for applications outside of the OEM finishing and refinishing of automobiles. They are particularly suitable for the coating, bonding and/or sealing of furniture, windows and doors, of interior and exterior constructions, and for industrial coating, including coil coating, container coating, and the impregnation or coating of electrical components. In the context of industrial coating, they are suitable for the coating, bonding and/or sealing of virtually all parts for private or industrial use, such as radiators, domestic appliances, small metal parts such as nuts and bolts, wheel caps, wheel rims, packaging, or electrical components such as motor windings or transformer windings.

In the case of electrically conductive substrates it is possible to use primers but used in a customary and known manner from electrodeposition coating materials. Both anodic and cathodic electrodeposition coating materials, but especially cathodics, are suitable for this purpose.

It is also possible to coat, bond or seal primed or unprimed plastics parts made, for example, of ABS, AMMA, ASA, CA, CAB, EP, UF, CF, MF, MPF, PF, PAN, PA, PE, HDPE, LDPE, LLDPE, UHMWPE, PC, PC/PBT, PC/PA, PET, PMMA, PP, PS, SB, PUR, PVC, RF, SAN, PBT, PPE, POM, PUR-RIM, SMC, BMC, PP-EPDM and UP (abbreviations to DIN 7728P1). Unfunctionalized and/or nonpolar substrate surfaces may be subjected prior to coating in a known manner to a pretreatment, such as with a plasma or by flaming, or provided with a water-based primer.

The coating materials, adhesives, and sealing compounds, especially the coating materials, may be applied by any customary application method, such as spraying, knife coating, brushing, flow coating, dipping, impregnating, trickling, or rolling, for example. The substrate to be coated may itself be at rest, with the application equipment or unit being moved. Alternatively, the substrate to be coated, especially a coil, may be moved, with the application unit being at rest relative to the substrate or being moved in an appropriate manner.

It is preferred to employ spray application methods, such as compressed-air spraying, airless spraying, high-speed rotation, electrostatic spray application (ESTA), alone or together with hot spray application such as hot air spraying, for example. Application may be made at temperatures of max. 70 to 80° C., so that appropriate application viscosities are achieved without the brief thermal exposure causing a change or damage to the coating material or to its overspray, which may be intended for recycling. For instance, the hot spraying may be configured such that the dual-cure coating material is heated only very briefly in the spray nozzle or shortly before the spray nozzle.

The spray booth used for application may, for example, be operated with a circulation system, which may be temperature-controllable, and which is operated with an appropriate absorption medium for the overspray, an example of such medium being the coating material itself.

Application is preferably conducted under illumination with visible light of a wavelength of above 550 nm or in the absence of light. By this means, material alteration or damage to the dual-cure coating material and to the overspray is avoided.

In general, the surfacer film, solid-color topcoat film, basecoat film, and clearcoat film are applied in a wet-film thickness such that curing thereof results in coats having the coat thicknesses that are advantageous and necessary for their functions. In the case of the surfacer coat this coat thickness is from 10 to 150, preferably from 15 to 120, with particular preference from 20 to 100, and in particular from 25 to 90 µm, in the case of the solid-color topcoat it is from 5 to 90, preferably from 10 to 80, with particular preference from 15 to 60, and in particular from 20 to 50 µm, in the case of the basecoat it is from 5 to 50, preferably from 6 to 40, with particular preference from 7 to 30, and in particular from 8 to 25 µm, and in the case of the clearcoats it is from 10 to 100, preferably from 15 to 80, with particular preference from 20 to 70, and in particular from 25 to 60 µm.

Curing may take place after a certain rest period. This period may have a duration of from 30 s to 2 h, preferably from 1 min to 1 h, and in particular from 1 min to 30 min. The rest period is used, for example, for leveling and devolatilization of the applied films or for the evaporation of volatile constituents such as solvent or water. The rest period may be shortened and/or assisted by the application of elevated temperatures up to 80° C., provided this does not entail any damage or alteration to the applied films, such as premature complete crosslinking.

The heat curing has no special features in terms of its method but instead takes place in accordance with the customary and known methods such as heating in a convection oven or irradiation with IR lamps. Heat curing may also take place in stages. Advantageously, it is effected at a temperature >100° C., preferably from 110 to 200° C., with particular preference from 120 to 190° C., and in particular from 130 to 180° C. for a period of from 1 min to 2 h, with particular preference from 2 min to 1 h, and in particular from 3 min to 30 min.

The adhesive films and seals of the invention produced from the adhesives and sealing compounds of the invention possess outstanding bond strength and sealing capacity even over long periods of time and even under extreme and/or rapidly changing climatic conditions.

The coats of the invention produced from the coating materials of the invention exhibit outstanding leveling and an outstanding overall visual impression. They are stable to weathering and do not yellow even in a tropical climate. They are therefore suitable for interior and exterior use.

As far as color, effect, gloss, and DOI (distinctiveness of the reflected image) are concerned, the multicoat color and/or effect systems produced using the coating materials are of the highest optical quality, have a smooth, untextured, hard, flexible, scratch- and abrasion-resistant surface, are weathering-, chemical- and etch-resistant, do not yellow, and exhibit no cracking or delamination of the coats.

Additional advantages, such as a particularly high gloss, for instance, result if the coats are exposed to actinic radiation following their production.

Consequently, the primed and unprimed substrates of the invention, especially bodies of automobiles and commercial vehicles, industrial components, including plastics parts, packaging, coils, and electrical components, or furniture, which have been coated with at least one coat of the invention, sealed with at least one seal of the invention, and/or bonded with at least one adhesive of the invention, therefore have particular technical and economic advantages, in particular a long service life, which makes them particularly attractive to the users.

EXAMPLES

Preparation Example 1

The Preparation of a Binder (B)

A laboratory reactor having a useful volume of 4 l and equipped with a stirrer, a dropping funnel for the monomer feed and a dropping funnel for the initiator feed, nitrogen inlet pipe, thermometer, and reflux condenser, was charged with 650 parts by weight of a fraction of aromatic hydrocarbons having a boiling range from 158 to 172° C. The solvent was heated to 140° C., after which a monomer mixture of 652 parts by weight of ethylhexyl acrylate, 383 parts by weight of hydroxyethyl methacrylate, 143 parts by weight of styrene, 213 parts by weight of 4-hydroxybutyl acrylate and 21 parts by weight of acrylic acid, and an initiator solution of 113 parts by weight of tert-butyl perethylhexanoate and 113 parts by weight of the aromatic solvent, were metered in at this temperature and at a uniform rate, with stirring, addition of the monomer mixture taking place over four hours and of the initiator solution over four and a half hours. The feeds were commenced simultaneously. After the end of the initiator feed, the reaction mixture was held at 140° C. for two hours and subsequently cooled. The reaction mixture was diluted with a mixture of 1-methoxypropyl 2-acetate, butyl glycol acetate and butyl acetate. The resultant binder solution had a solids content of 65% by weight (1 h/130° C.) and an acid number of 15 mg KOH/g.

Example 1

The Preparation of a Two-Component Clearcoat Material of the Invention

The binder component of the two-component clearcoat material of the invention was prepared by mixing 35.9 parts by weight of the binder solution of Preparation Example 1, 20.0 parts by weight of dipentaerythritol pentaacrylate (Sartomer® 399 from Cray Valley), 1.3 parts by weight of a substituted hydroxyphenyltriazine (65% strength in toluene), 1.0 part by weight of N-amino ether 2,2,6,6-tetramethylpiperidinyl ester (Tinuvin® 123 from Ciba Specialty Chemicals), 0.4 part by weight of BYK® 306 (commercial leveling agent from Byk Chemie), 27.4 parts by weight of butyl acetate, 10 parts by weight of solvent naphtha and 3.0 parts by weight of ADDID® 600 (benzpinacol silyl ether from Wacker Chemie).

The binder component was mixed in a weight ratio of 100:30 with an isocyanato acrylate (Roskydal® UA VPLS 2337; isocyanate group content: 12% by weight; Bayer AG).

The resultant ready-to-spray clearcoat had a viscosity of 19 seconds in the DIN4 efflux cup.

Example 2

The Production of a Multicoat System of the Invention

To produce the multicoat system, steel test panels coated with an electrodeposition coating in a dry-film thickness of from 18 to 22 µm were coated with an aqueous surfacer. The resultant aqueous surfacer film was baked at 160° C. for 20 minutes to give a surfacer coat with a dry-film thickness of from 35 to 40 µm. The surfacer coat was subsequently coated with a black aqueous basecoat material in a film thickness of from 12 to 15 µm, and the resultant aqueous basecoat films was flashed off at 80° C. for 10 minutes. Thereafter, the clearcoat material of Example 1 was applied pneumatically in one cross-pass using a gravity-feed gun, in a film thickness of from 40 to 45 µm. Subsequently, the basecoat film and the clearcoat film were cured in a convection oven at 140° C. for 20 minutes.

The multicoat system of the invention had a gloss of 88.8 to DIN 67530 and a micropenetration hardness of 78 N/mm$^2$ (universal hardness at 25.6 mN, Fischerscope 100 V with diamond pyramid in accordance with Vickers).

The scratch resistance of the multicoat system was determined by the sand test. For this purpose, the film surface was loaded with sand (20 g of quartz silver sand, 1.5–2.0 mm). The sand was placed in a beaker (with its base cut off level) which was attached firmly to the test panel. The panel, with the beaker and the sand, was set in shaking movements by means of a motor drive. The movement of the loose sand caused damage to the film surface (100 double strokes in 20 s). After sand exposure, the test area was cleaned of abraded material, wiped off carefully under a jet of cold water, and then dried with compressed air. The gloss was measured to DIN 67530 before and after damage (measurement direction perpendicular to the direction of scratching):

initial: 89.2 after damage: 79

In addition, the scratch resistance was determined by the brush test as well. For this test the test panels bearing the multicoat system were stored at room temperature for at least 2 weeks, before the test was carried out.

The scratch resistance was assessed with the aid of the BASF brush test described in FIG. 2 on page 28 of the article by P. Betz and A. Bartelt, Progress in Organic Coatings, 22 (1993), pages 27–37, which was modified, however, in respect of the weight used (2000 g instead of the 280 g specified therein), assessment taking place as follows:

In the test, the film surface was damaged using a weighted mesh fabric. The mesh fabric and the film surface were wetted generously with a laundry detergent solution. The test panel was moved backward and forward in reciprocating movements under the mesh fabric by means of a motor drive.

The test element was an eraser (4.5×2.0 cm, broad side perpendicular to the direction of scratching) lined with nylon mesh fabric (No. 11, 31 µm mesh size, Tg 50° C.). The applied weight was 2000 g.

Prior to each test the mesh fabric was replaced, with the running direction of the fabric meshes parallel to the direction of scratching. Using a pipette, approximately 1 ml of a freshly stirred 0.25% strength solution of Persil was applied in front of the eraser. The rotary speed of the motor was set so that 80 double strokes were performed in a period of 80 s. After the test, the remaining washing liquid was rinsed off with cold tap water and the test panels were blown dry using compressed air. A measurement was made of the gloss to DIN 67530 before and after damage (measurement direction perpendicular to the direction of scratching):

initial: 88.8 after damage: 85

The experimental results demonstrate the outstanding optical properties, the high scratch resistance, and the high abrasion resistance of the multicoat system.

What is claimed is:

1. A heat-curable composition comprising
   (I) at least one constituent whose molecule comprises on average at least one functional group selected from the group consisting of
      (A) functional groups containing at least one bond activated by means selected from heat, actinic radiation, and mixtures thereof,
      (B) reactive functional groups able to undergo thermal crosslinking reactions with groups selected from the group consisting of reactive functional groups, complementary reactive functional groups, and mixtures thereof,
      and mixtures thereof, with the provisos that there are always groups (A) and (B) in the composition and said constituent may not be a member selected from the group consisting of polyurethane dispersions synthesized from aliphatic polyisocyanates, compounds containing isocyanate-reactive functional groups and containing bonds activated with actinic radiation, aliphatic compounds containing isocyanate-reactive functional groups, compounds containing isocyanate-reactive functional groups and dispersing functional groups, neutralizing agents for the dispersing functional groups, blocking agents for isocyanate groups, compounds containing blocked isocyanate groups wherein the blocked isocyanate groups are introduced into the polyurethane dispersion by the reaction of blocking agents with isocyanate-containing polyurethane prepolymers, and mixtures thereof; and
   (II) from 0.5 to 15% by weight, based on the solids of the heat-curable composition, of at least one C-C-cleaving initiator comprising a mixture of monomeric and oligomeric benzpinacol silylethers.

2. The composition of claim 1 wherein the mixture of monomeric and oligomeric benzpinacol silylethers comprises those of the general formulae I and II

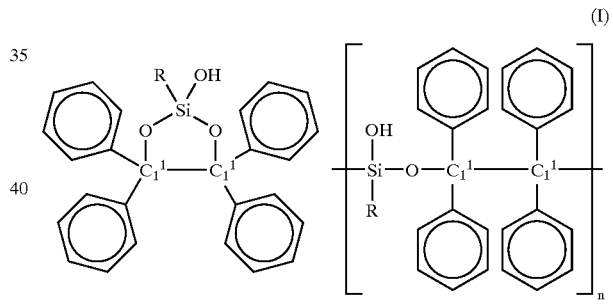

wherein R is selected from the group consisting of alkyl radicals of 1 to 10 carbon atoms, cycloalkyl radicals of 3 to 10 carbon atoms, aryl radicals of 6 to 12 carbon atoms, and mixtures thereof, and n is an integer from 2 to 100.

3. A heat-curable composition comprising
   (I) at least one constituent whose molecule comprises on average at least one functional group selected from the group consisting of
      (A) functional groups containing at least one bond activated by means selected from the group consisting of heat, actinic radiation, and mixtures thereof,
      (B) reactive functional groups able to undergo thermal crosslinking reactions with reactive functional groups, complementary reactive functional groups, and mixtures thereof, and mixtures thereof, with the proviso that there are always groups (A) and (B) in the composition; and
   (II) a mixture of monomeric and oligomeric benzpinacol silyl ethers.

4. The composition of claim 3, wherein the mixture of benzpinacol silyl ethers comprises those of the general formulae I and II

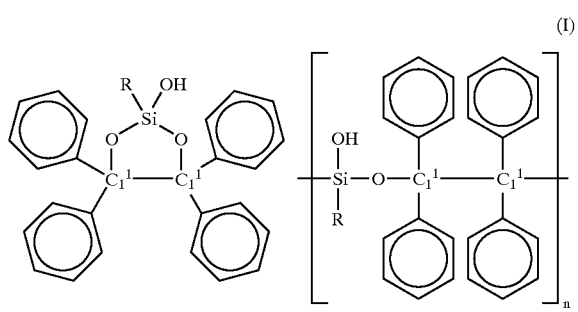

wherein R is selected from the group consisting of alkyl radicals of 1 to 10 carbon atoms, cycloalkyl radicals of 3 to 10 carbon atoms, aryl radicals of 6 to 12 carbon atoms, and mixtures thereof, and n is an integer from 2 to 100.

5. The composition of claim 1 wherein the bonds activated by actinic radiation are selected from the group consisting of carbon-hydrogen single bonds, carbon-carbon single bonds, carbon-carbon double bonds, carbon-oxygen single bonds, carbon-oxygen double bonds, carbon-nitrogen single bonds, carbon-nitrogen double bonds, carbon-phosphorus single bonds, carbon-phosphorus double bonds, carbon-silicon single bonds, carbon-silicon double bonds.

6. The composition of claim 5, wherein the bonds activated by actinic radiation are carbon-carbon double bonds.

7. The composition of claim 1, wherein the bonds activated by actinic radiation are carbon-carbon double bonds present present in a member selected from the group consisting of (meth)acrylate, ethacrylate, crotonate, cinnamate, vinyl ether, vinyl ester, dicyclopentadienyl, norbornenyl, isoprenyl, allyl and butenyl groups; dicyclopentadienyl ether, norbornenyl ether, isoprenyl ether, isopropenyl ether, allyl ether and butenyl ether groups; and dicyclopentadienyl ester, norbornenyl ester, isoprenyl ester, isopropenyl ester, allyl ester and butenyl groups.

8. The composition of claim 1, comprising complementary reactive functional groups wherein at least one reactive functional group is selected from the group consisting of thio, hydroxyl, amino N-methylolamino, N-alkoxymethylamino, imino, carbanate, allophanate, carboxyl groups, and mixtures thereof, and at least one other reactive functional group is selected from the group consisting of anhydride, epoxy, blocked and unblocked isocyanate, urethane, methylol, methylol ether, siloxane, carbonate, beta-hydroxyalkylamide groups, and mixtures thereof.

9. The composition of claim 1, wherein the constituents comprise compounds, oligomers and/or polymers.

10. The composition of claim 9, wherein the oligomers and polymers comprise one or more members selected from the group consisting of polymers and copolymers of ethylenically unsaturated monomers, polyaddition resins, polycondensation resins, and mixtures thereof.

11. The composition of claim 9, wherein the compounds are crosslinking agents.

12. The composition of claim 1, comprising at least one photoinitiator.

13. The composition of claim 1 which is a coating material, adhesive, or sealing compound.

14. A coating material, adhesive, or sealing compound comprising at least one heat-curable composition of claim 1.

15. The coating material, adhesive, or sealing compound of claim 14, which is a one-component system.

16. The coating material, adhesive or sealing compound of claim 14, which is selected from the group consisting of solventborne systems, aqueous systems, essentially water- and solvent-free liquid (100%) systems, finely divided solid systems, and aqueous dispersions of powder coating materials.

17. A method of making a coated film, an adhesive film or a seal, comprising applying the coating material, adhesive, or sealing compound of claim 14 to a substrate.

18. The method of claim 17 wherein the substrate is selected from the group consisting of automotive OEM substrates, previously coated substrates, doors, windows, furniture, interior substrates, exterior substrates, container coating substrates, coil coating substrates, electrical component substrates, and mixtures thereof.

* * * * *